US012802106B2

(12) United States Patent
Shanson et al.

(10) Patent No.: US 12,802,106 B2
(45) Date of Patent: *Nov. 17, 2026

(54) STORING AND RETRIEVING UNUSED ADVERTISEMENTS

(71) Applicant: Paramount Global, New York, NY (US)

(72) Inventors: Spencer Shanson, Los Angeles, CA (US); Jonathan Gwiazda, Los Angeles, CA (US); Adrian Chiu, Los Angeles, CA (US); Nikolay Lebedev, Los Angeles, CA (US); Indira Ghosh, Los Angeles, CA (US)

(73) Assignee: Paramount Global, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/232,289

(22) Filed: Jun. 9, 2025

(65) Prior Publication Data

US 2026/0073429 A1 Mar. 12, 2026

Related U.S. Application Data

(63) Continuation of application No. 18/156,854, filed on Jan. 19, 2023, now Pat. No. 12,346,938, which is a (Continued)

(51) Int. Cl.

*G06Q 30/0241* (2023.01)
*G06F 16/71* (2019.01)

(Continued)

(52) U.S. Cl.

CPC ......... *G06Q 30/0277* (2013.01); *G06F 16/71* (2019.01); *H04L 65/60* (2013.01);

(Continued)

(58) Field of Classification Search

CPC ........... G06Q 30/0277; G06Q 30/0255; G06Q 30/0271; G06F 16/71; G06F 16/738;

(Continued)

(56) References Cited

U.S. PATENT DOCUMENTS 9,955,122 B2 * 4/2018 Karlsson ............ H04N 21/6408
2008/0195468 A1 * 8/2008 Malik .................... G06Q 30/02 705/14.67

(Continued)

*Primary Examiner* — Nathan J Flynn
*Assistant Examiner* — Christine A Kurien
(74) *Attorney, Agent, or Firm* — Fay Kaplun & Marcin, LLP

(57) ABSTRACT

The exemplary embodiments relate to implementing a mechanism that is configured to select and insert a video advertisement into a video stream that is to be provided to a user device by a streaming service. This may include receiving a request for a video stream from a user device. In response to the request, transmitting a first portion of the video stream to the user device and determining that second a portion of the video stream is to include multiple video advertisements. One or more video advertisements may be selected from a database that includes a set of video advertisements that were previously removed from a further video stream. The one or more video advertisements may then be inserted into the video stream. The second portion of the video stream is then transmitted to the user device.

15 Claims, 5 Drawing Sheets

Related U.S. Application Data continuation of application No. 16/790,962, filed on Feb. 14, 2020, now Pat. No. 11,593,846.

(51) Int. Cl.

| | |
|---|---|
| ***H04L 65/60*** | (2022.01) |
| ***H04N 21/231*** | (2011.01) |
| ***H04N 21/234*** | (2011.01) |
| ***H04N 21/239*** | (2011.01) |
| ***H04N 21/81*** | (2011.01) |

(52) U.S. Cl.

CPC ..... *H04N 21/231* (2013.01); *H04N 21/23424* (2013.01); *H04N 21/2393* (2013.01); *H04N 21/812* (2013.01)

(58) Field of Classification Search

CPC ... H04L 65/60; H04L 65/1069; H04L 65/612; H04L 65/762; H04L 65/765; H04N 21/231; H04N 21/23424; H04N 21/2393; H04N 21/812; H04N 21/25866; H04N 21/2668; H04N 21/47202

See application file for complete search history.

(56) References Cited

U.S. PATENT DOCUMENTS

| | | | | |
|---|---|---|---|---|
| 2013/0086607 | A1* | 4/2013 | Tom | H04N 21/8153 725/32 |
| 2015/0341410 | A1* | 11/2015 | Schrempp | G06F 18/22 709/231 |
| 2017/0164022 | A1* | 6/2017 | Grant | H04N 21/2221 |
| 2018/0189276 | A1* | 7/2018 | Fonseca, Jr. | H04N 21/812 |

* cited by examiner

STORING AND RETRIEVING UNUSED ADVERTISEMENTS

PRIORITY DATA

The present application is a Continuation application of U.S. patent application Ser. No. 18/156,854 filed on Jan. 19, 2023; which is a Continuation application of U.S. patent application Ser. No. 16/790,962 filed on Feb. 14, 2020, now U.S. Pat. No. 11,593,846; the entire disclosure of the above application(s)/patent(s) is expressly incorporated herein by reference.

BACKGROUND INFORMATION

A streaming service may provide a video stream to a user device. To generate revenue, some streaming services may insert video advertisements into the video stream. For any of a variety of different reasons, a time slot that may include a video advertisement may not be filled or may be scheduled to include unpaid content. Thus, the streaming service may not be efficiently utilizing scheduled revenue generating opportunities.

SUMMARY

Some exemplary embodiments include a method performed at a streaming service. The method comprising, receiving a request for a video stream from a user device. The method further comprising, transmitting a first portion of the video stream to the user device in response to the request. The method further comprising, determining that second a portion of the video stream is to include multiple video advertisements. The method further comprising, selecting one or more video advertisements to include in the portion of the video stream from a database. The database includes a set of video advertisements that were previously removed from a further video stream. The method further comprising, inserting the one or more video advertisements into the video stream. The method further comprising, transmitting a second portion of the video stream to the user device. The second portion includes the one or more video advertisements.

Other exemplary embodiments include a server comprising a communication interface configured to provide a video stream to a user device and a processor configured to perform operations. The operations comprising, receiving a request for the video stream from the user device. The operations further comprising, transmitting a first portion of the video stream to the user device in response to the request. The operations further comprising, determining that second a portion of the video stream is to include multiple video advertisements. The operations further comprising, selecting one or more video advertisements to include in the portion of the video stream from a database. The database includes a set of video advertisements that were previously removed from a further video stream. The operations further comprising, inserting the one or more video advertisements into the video stream. The operations further comprising, transmitting a second portion of the video stream to the user device. The second portion includes the one or more video advertisements.

Still further exemplary embodiments include a non-transitory computer readable storage medium including a set of instructions executable by a processor, when executed the set of the instructions cause the processor to perform operations. The operations comprising, receiving a request for the video stream from the user device. The operations further comprising, transmitting a first portion of the video stream to the user device in response to the request. The operations further comprising, determining that second a portion of the video stream is to include multiple video advertisements. The operations further comprising, selecting one or more video advertisements to include in the portion of the video stream from a database. The database includes a set of video advertisements that were previously removed from a further video stream. The operations further comprising, inserting the one or more video advertisements into the video stream. The operations further comprising, transmitting a second portion of the video stream to the user device. The second portion includes the one or more video advertisements.

DETAILED DESCRIPTION

Figure 1:
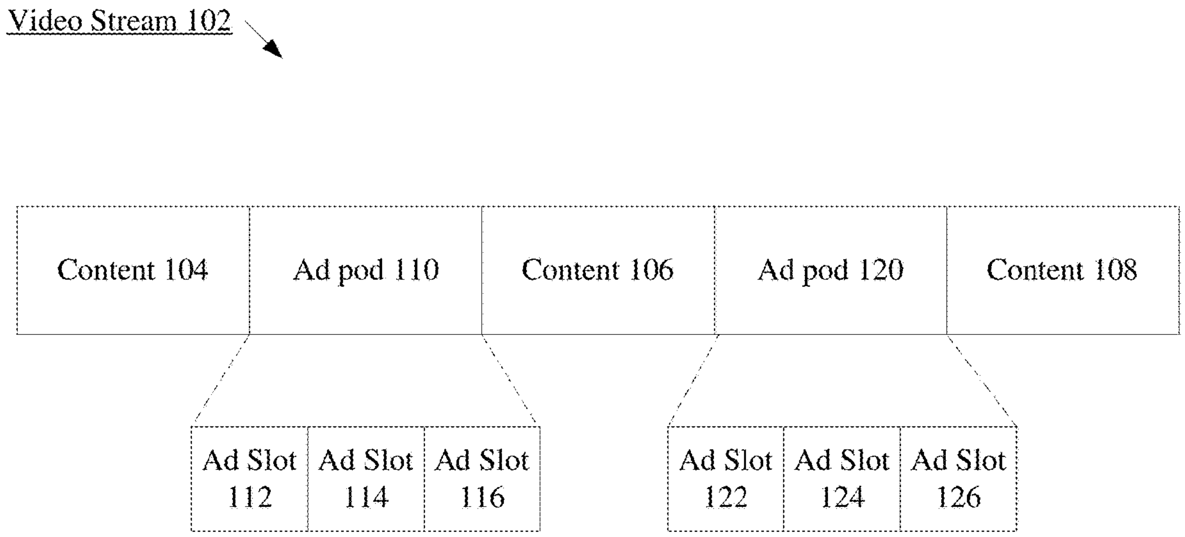
FIG. 1 illustrates a representation of a video stream including multiple ad pods according to various exemplary embodiments.

The exemplary embodiments may be further understood with reference to the following description and the related appended drawings, wherein like elements are provided with the same reference numerals. The exemplary embodiments relate to implementing a mechanism that is configured to select and insert a video advertisement into a video stream that is to be provided to a user device by a streaming service. In a first aspect, the exemplary embodiments relate to the streaming service identifying, removing and storing one or more instances of a video advertisement that is configured to appear multiple times during a particular portion of a video stream. In a second aspect, the exemplary embodiments relate to selecting a video advertisement that was previously removed from a particular portion of a video stream and inserting the video advertisement into a different portion of the same video stream or a different video stream. As will be described below, the exemplary embodiments improve the efficiency with which revenue generating opportunities are utilized by the streaming service without negatively impacting the viewing experience or the advertiser's targeting requirements.

The exemplary embodiments are described with regard to a streaming service providing a video stream to a user device. The video stream may be either a linear channel stream or a video on demand (VOD) stream. The term "linear channel stream" may refer to a video stream that includes content that is selected by the provider of the video stream and configured to be viewed at a set time. For example, the content of the linear channel stream may be provided in accordance with a schedule configured by the streaming service. Each linear channel stream may show the same content at the same time. The term "VOD stream" may refer to a video stream that includes content that is selected by the user and provided to the corresponding user device in response to the selection. For example, user input at the user device may indicate to the streaming service that the user has requested to watch a particular program. In response, the streaming service may provide a video stream of the selected program to the user device. Reference to the linear channel stream and the VOD stream is only provided for illustrative purposes, different entities may refer to similar concepts by a different name. The exemplary embodiments apply to both the linear channel stream and the VOD stream. Throughout this description, the term video stream may represent either the linear channel stream or the VOD stream.

The exemplary embodiments are also described with regard to the video stream including one or more ad pods. Throughout this description, the term "ad pod" refers to a sequential set of one or more ad slots that are to be included in a video stream. Each ad slot of the ad pod may be configured to include one or more video advertisements or a single video advertisement may occupy more than one ad slot. Thus, the number of video advertisements included in each ad pod may vary. Reference to the terms ad pod and ad slot are merely provided for illustrative purposes, different entities may refer to a similar concept by a different name.

FIG. 1 illustrates a representation of a video stream 102 including multiple ad pods 110, 120 according to various exemplary embodiments. Any reference to the video stream 102 possessing any particular characteristic is merely provided for illustrative purposes. The video stream 102 is not intended to limit the exemplary embodiments in any way and is only intended to provide a general example of the relationship between an ad slot, an ad pod and the video stream.

The video stream 102 includes three portions of content 104, 106, 108. Each portion of content may include multimedia data corresponding to the same program (e.g., movie, show, clips, etc.) or a different program. The video stream 102 further includes a first ad pod 110 and a second ad pod 120. Reference to two ad pods 110, 120 and three portions of content 104, 106, 108 is only provided for illustrative purposes. An actual video stream may include any combination of program content and ad pods.

The ad pod 110 includes three ad slots, 112, 114, 116 and each ad slot 112, 114, 116 may be configured to include one or more video advertisements. However, in some configurations, a single video advertisement may be configured to occupy more than one ad slot. The duration of the ad pod 110 may be predetermined and the total duration of the one or more video advertisements may not exceed the duration of the ad pod 110. Reference to the ad pod 110 including three ad slots, 112, 114, 116 is only provided for illustrative purposes. An actual ad pod may include any number of ad slots.

Similarly, the ad pod 120 includes three ad slots 122, 124, 126. Like the ad pod 110, the duration of the ad pod 120 may be predetermined and the total duration of the one or more video advertisements may not exceed the duration of the ad pod 120. As mentioned above, an actual ad pod may include any number of ad slots.

To provide a general example from the user's perspective, consider the following exemplary scenario in which the user accesses a streaming service at a user device. The user device may be equipped with hardware, software and/or firmware configured to receive the video stream 102 and generate video and/or audio output based, at least in part, on the multimedia data included in the video stream 102.

Initially, the user device receives the first portion of content 104 and generates video and/or audio output based on the multimedia data included in the first portion of content 104. Subsequently, the user device receives the ad pod 110 and generates video and/or audio output based on the multimedia data for the video advertisement included in the ad slot 112, the video advertisement included in ad slot 114 and the video advertisement included in ad slot 116. Next, the user device receives the second portion of content 106 and generates video and/or audio output based on the multimedia data included in the second portion of content 106. The user device then receives the ad pod 120 and generates video and/or audio output based on the multimedia data for the video advertisement included in the ad slot 122, the video advertisement included in ad slot 124 and the video advertisement included in ad slot 126. Finally, the user device receives the third portion of content 108 and generates video and/or audio output based on the multimedia data included in the third portion of content 108.

Figure 2:
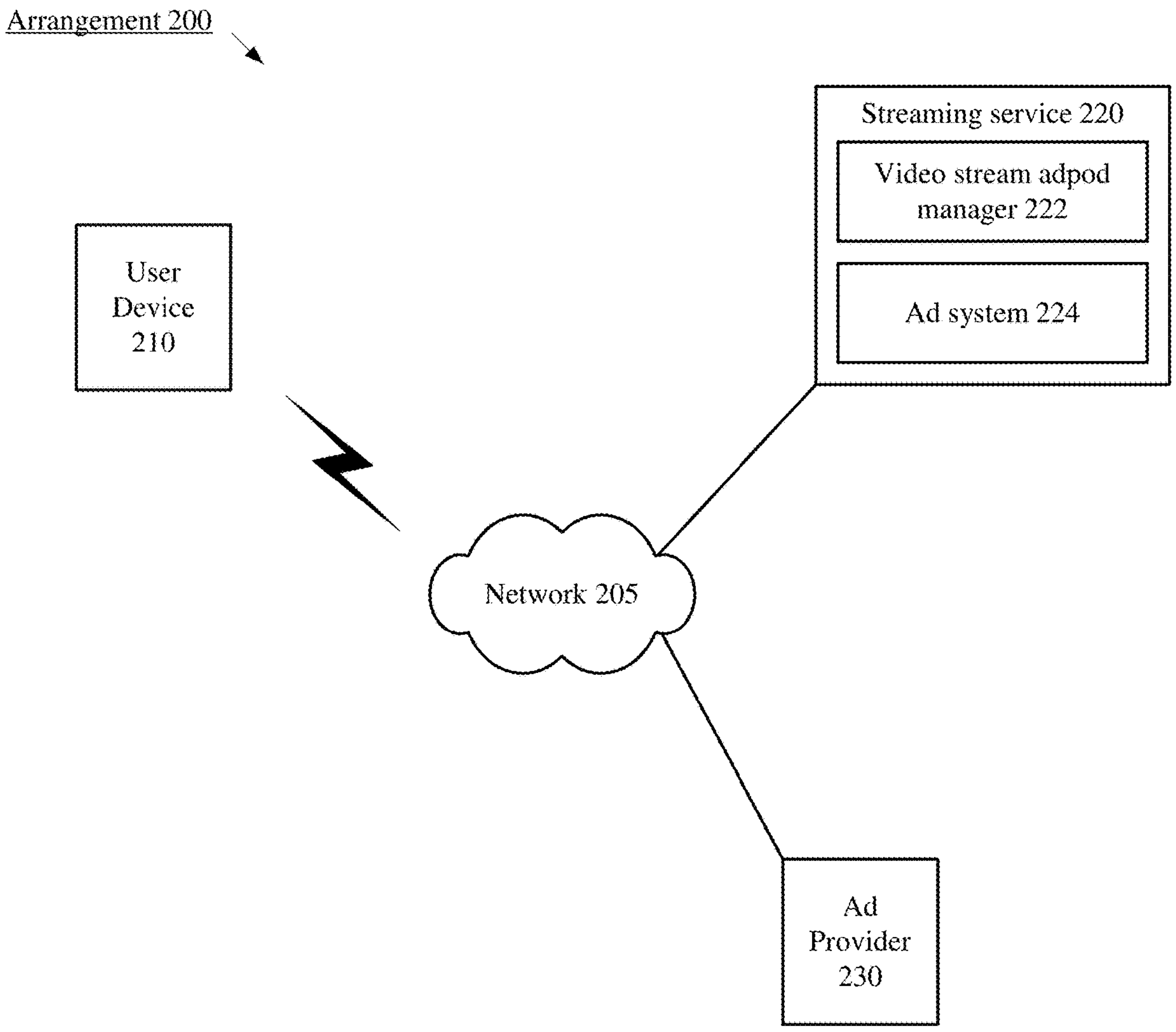
FIG. 2 shows an exemplary arrangement according to various exemplary embodiments.

FIG. 2 shows an exemplary arrangement 200 according to various exemplary embodiments. The arrangement 200 includes a network 205, a user device 210, a streaming service 220 and an ad provider 230. The exemplary arrangement 200 will be described with regard to the video stream 102 of FIG. 1. However, reference to the video stream 102 is not intended to limit the exemplary embodiments in any way. Instead, the video stream 102 is only referenced to provide a general example of a portion of a video stream that may be provided from the streaming service 220 to the user device 210. Those skilled in the art would understand that the exemplary embodiments may apply to a video stream possessing any combination of appropriate characteristics.

As will be described in more detail below, some exemplary embodiments may relate to a scenario in which the user device 210 establishes a connection to the streaming service 220 via the network 205. The streaming service 220 is configured to provide the video stream 102 to the user device 210. The streaming service 220 may communicate with the ad provider 230 to fill the ad slots 112-116, 122-126 of the ad pods 110, 120 with paid advertising content. The ad provider 230 may provide video advertisements that are to be included in one or more of the ad slots 112-116, 122-126 of the ad pods 110, 120 from the video stream 102.

Those skilled in the art will understand that the user device 210 may be any type of electronic component that is configured to communicate via a network, e.g., a mobile phone, a tablet computer, a smartphone, a laptop computer, a desktop computer, a set top box, a multimedia receiver, a smart TV, a game console, a wearable device, an internet of things (IOT) device, etc. Thus, the user device 210 may represent any electronic device equipped with hardware, software and/or firmware configured to receive a video stream and directly or indirectly generate video/audio output based on the multimedia data included in the video stream. Reference to a single user device 210 in the arrangement 200 is only for illustrative purposes, an actual arrangement may include any number of user devices being used by any number of users.

The network 205 may represent one or more networks. The user device 210, the streaming service 220 and the ad provider 230 may each connect to the network 205 wirelessly or using a wired connection. Those skilled in the art will understand the procedures and protocols that may be implemented for each of the user device 210, the streaming service 220 and the ad provider 230 to connect to the network 205 and communicate with a remote endpoint via the network connection.

In the example of FIG. 2, the streaming service 220 and the ad provider 230 are shown as having a wired connection to the network 205 and the user device 210 is shown as having a wireless connection. It should be understood that each of the component 21-230 may connect in any manner to the network 205. In addition, the network 205 may represent one or more networks. For example, the entity providing the streaming service 220 may have an internal network (e.g., LAN) that connects to the public Internet to provide the streaming service 220. Thus, it should be understood that network 205 may represent any manner and/or network used to connect the various components or arrangement 200.

The user device 210 may be equipped with a video player that is configured to generate video and/or audio output based on, at least in part, multimedia data received from the streaming service 220. In some embodiments, the user device 210 may access the streaming service 220 via a user-facing application. In other embodiments, the user device 210 may access the streaming service 220 via a web browser. However, any reference to the user device 210 accessing the streaming service 220 in any particular manner is only provided for illustrative purposes. The exemplary embodiments may apply to the user device 210 accessing the streaming service 220 is any appropriate manner.

The streaming service 220 may provide one or more linear channel streams and/or multiple programs available on demand. In this example, when connected to the user device 210, the streaming service 220 may be configured to provide the video stream 102 as either a linear channel stream or a VOD stream. The streaming service 220 may utilize various hardware, software and/or firmware components to provide video streams to connected user devices. For example, the streaming service may be comprised of one or more servers. Each server may include a processor configured to perform various operations on behalf of the streaming service 220. However, reference to a processor is merely for illustrative purposes. The operations performed by each server may also be represented as a separate incorporated component of the server or may be a modular component coupled to the server, e.g., an integrated circuit with or without firmware. For example, the integrated circuit may include input circuitry to receive signals and processing circuitry to process the signals and other information. In addition, in some servers, the functionality of the processor is split among two or more processors. In other embodiments, the functionality described for the server may include a cloud implementation. The exemplary embodiments may be implemented in any of these or other configurations of a server.

The streaming service 220 may also include one or more databases that are directly or indirectly accessible by the one or more servers. For example, the streaming service 220 may use a database to store multimedia data that is to be included in a linear channel stream or a VOD stream, a database for storing video advertisements that are to be included in an ad pod and a database for storing an indication that one or more instances of a video advertisement have been removed from a video stream. These databases may be implemented using hardware, software and/or firmware of a single device (e.g., server) or may be implemented using hardware, software and/or firmware from multiple devices.

The ad provider 230 may represent a platform that enables advertisers to purchase available ad slots. To provide an example, the streaming service 220 may determine that the user device 210 is associated with a set of parameters. The parameters may include but are not limited to, a location of the user device 210, the type of content being viewed, the type of device, etc. The streaming service 220 may then indicate to the ad provider 230 that ad slots 112-116, 122-126 for the video stream 102 that is to be provided to the user device 210 are available for purchase. Advertisers may purchase ad slots based on, at least in part, the parameters associated with the user device 210 that is to receive the corresponding video stream 102. An advertiser may purchase one or more ad slots associated with the user device 210 and/or other devices configured to receive a video stream from the streaming service 220. Subsequently, an indication that a particular video advertisement is to be included in one of more of the ad slots 112-116, 122-126 is provided to the streaming service 220.

The process of the streaming service 220 making an ad slot available for purchase and the advertiser purchasing the ad slot via the ad provider 230 may occur after the user device 210 has requested to view a linear channel stream or initiated a VOD stream. For example, while the user device is receiving the first portion of content 104 of the video stream 102, the streaming service may send the indication of available ad slots 112-116 for the first ad pod 110 to the ad provider 230. Similarly, while the user device is receiving the second portion of content 106 of the video stream 102, the streaming service may send the indication of available ad slots 122-126 for the first ad pod 120 to the ad provider 230. The exemplary embodiments are not limited to receiving advertisements from the ad provider 230 (or a similar platform). Other exemplary sources for video advertisements will be described below with regard to FIGS. 3-4.

The above example is not intended to limit the exemplary embodiments in any way and is only intended to provide a general example of how the streaming service 220 may utilize the ad provider 230 (or a similar platform). Examples of other interactions that may occur between the streaming service 220 and the ad provider 230 are provide below with regard to FIG. 4. However, the specific functionality of the ad provider 230 is not relevant to the exemplary embodiments.

The streaming service 220 may also include one or more communication interfaces configured to facilitate communication with connected user devices, with the network 205, with the ad provider 230 and between hardware, software and/or firmware components included within the streaming service 220.

The exemplary embodiments are described with regard to the streaming service 220 including a video stream ad pod manager 222 and an ad system 224. The video stream ad pod manager 222 may represent software and/or firmware configured to perform operations related to ad pods that are to be included in a video stream. For example, when the streaming service 220 determines that the video stream 102 is to be provided to the user device 210, the video stream ad pod manager 222 may determine the duration of the ad pods, 110, 120 and communicate with the ad system 224 to fill the ad pods 110, 120.

As will be described in more detail below with regard to FIG. 4, the ad system 224 may include various hardware, software and/or firmware components related to filling ad pods with video advertisements. The ad system 224 may communicate with the video stream ad pod manager 222. For example, the ad system 224 may receive a request from the video stream ad pod manager 222 indicating that ad pods 110, 120 are available to be filled with video advertisements. The ad system 224 may also communicate with the ad provider 230. For example, the ad system 224 may indicate to the ad provider 230 that ad slots are available to purchase. In response, the ad system 224 may receive an indication that an advertiser has purchased one or more ad slots.

For any of a variety of different reasons, an ad pod may be configured to include a particular video advertisement more than once. For example, the ad slot 112 of the ad pod 110 may be configured to include a video advertisement and the ad slot 114 of the ad pod 110 may be configured to include the same video advertisement. Watching the same video advertisement multiple times during a portion of the video stream corresponding to a single ad pod may cause a poor user experience. Under conventional circumstances, the streaming service 220 may remove one of the duplicate video advertisements from an ad pod and fill the corresponding ad slot with unpaid content or remove the ad slot entirely. Continuing with the example provided above, the streaming service 220 may remove the video advertisement from ad slot 114 of the ad pod 110 and fill the ad slot with unpaid content, e.g., an advertisement for the streaming service's 220 own content, a graphic or animation, a black screen, etc. When a ad slot is not used for a paid advertisement, the streaming service 220 is not taking advantage of a scheduled revenue generating opportunity.

The exemplary embodiments provide devices, systems and methods for implementing a mechanism that is configured to improve the efficiency with which ad pods are utilized by the streaming service 220. In a first aspect, the exemplary embodiments relate to identifying, removing and storing one or more instances of a video advertisement that is configured to appear multiple times in a single ad pod. In a second aspect, the exemplary embodiments relate to inserting a video advertisement that was previously removed from an ad pod into an ad slot of a different ad pod. As will be demonstrated below, the exemplary embodiments improve the efficiency with which an ad pod is utilized without negatively impacting the viewing experience and without negatively impacting the advertiser's targeting goals.

Figure 3:
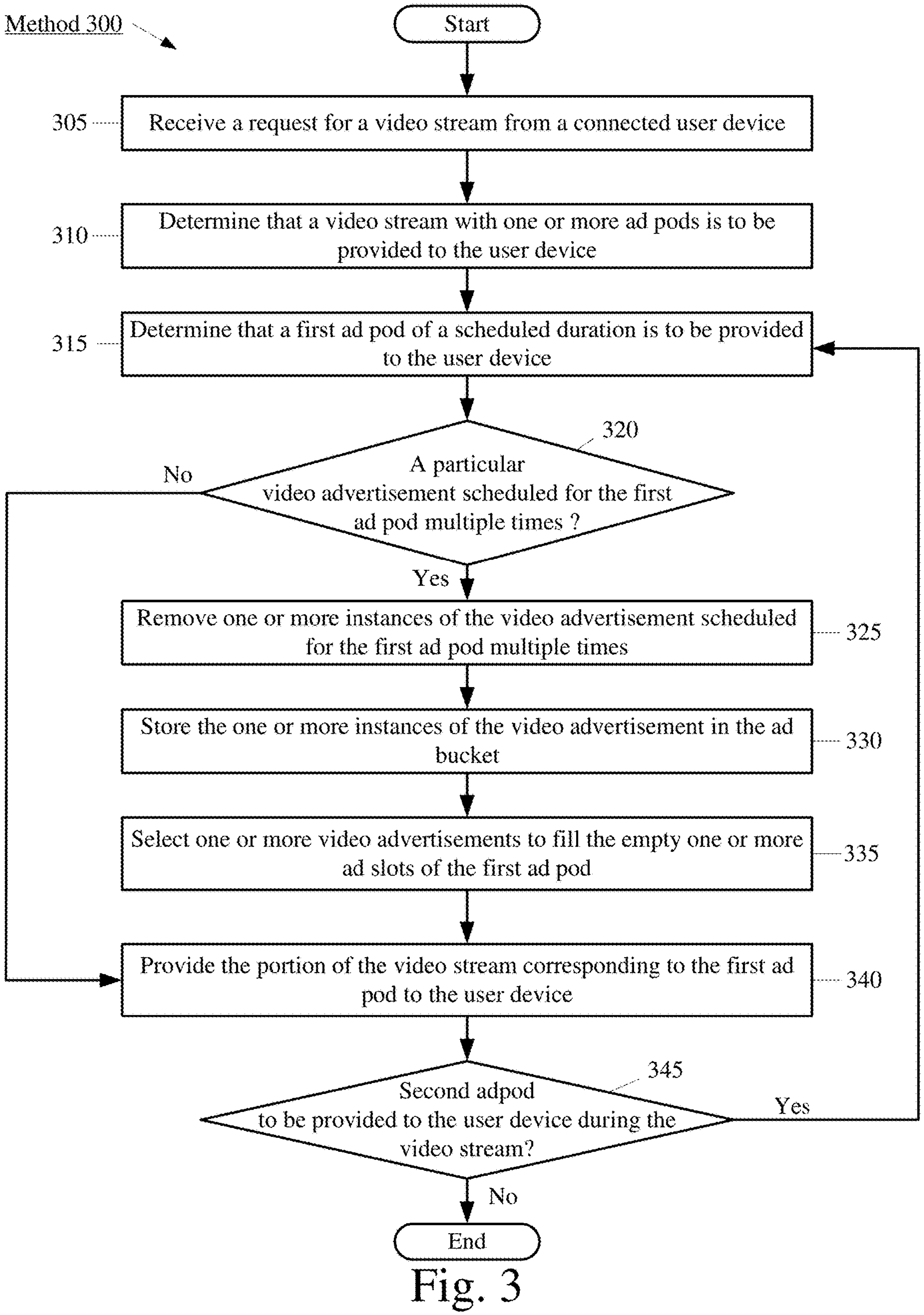
FIG. 3 shows a method for the streaming service to configure one or more ad pods included in a video stream according to various exemplary embodiments.

Initially, the method 300 of FIG. 3 will describe a general example of how the streaming service 220 may configure an ad pod that is to be provided to the user device 210. Subsequently, FIG. 4 will describe various exemplary components of the ad system 224 and the signaling diagram 500 of FIG. 5 will describe how the various exemplary components of the ad system 224 may be used to configure an ad pod that is to be provided to the user device 210.

FIG. 3 shows a method 300 for the streaming service 220 to configure one or more ad pods included in a video stream according to various exemplary embodiments. The method 300 will be described with regard to the arrangement 200 of FIG. 2.

In 305, the streaming service 220 receives a request for a video stream from a connected user device 210. For example, user input at the user device 210 may indicate to the streaming service 220 that a particular linear channel stream has been selected by the user or that a particular program has been selected from a video library to be provided on demand.

In 310, the streaming service 220 determines that a video stream with one or more ad pods is to be provided to the user device 210. For example, in response to the request, the streaming service 220 may determine that the video stream 102 is to be provided to the user device 210. In this example, the video stream 102 may represent either a linear channel stream or a VOD stream.

In 315, the streaming service 220 determines that a first ad pod of a scheduled duration is to be provided to the user device 210. For instance, the streaming service 220 may determine that the ad pod 110 of the video stream 102 is scheduled for a particular duration. The ad proxy 410 may then be used to fill the ad pod 110 with video advertisements such that the total duration of the video advertisements do not exceed the duration of the ad pod 110. For instance, the ad proxy 410 may determine that a first video advertisement is scheduled for ad slot 112 of the ad pod 110, a second video advertisement is scheduled for ad slot 114 of the ad pod 110 and a third video advertisement is scheduled for ad slot 116 of the ad pod 110. As will be described below, one or more of the first video advertisement, the second video advertisement or the third video advertisement may be the same video advertisement.

During operation, the video stream ad pod manager 222 may incorporate video advertisements into the ad pod 110 based on information received from the ad proxy 410. For example, the ad system 224 may include a database for video advertisements that advertisers have paid to be included in a video stream before the request has been received from the user device 210. When the video stream ad pod manager 222 determines that the video stream 102 is to be provided to the user device 210, the video stream ad pod manager 222 may send a request to the ad system 224 via the ad proxy 410. In response, the ad system 224 may retrieve any of these video advertisements. The request may include an indication of a set of parameters associated with the user device 210 which allows advertisers to purchase advertising space from the streaming service 220 that is targeted towards user devices that are associated with a particular one or more parameter (e.g., geographic location, type of device, content genre, etc.). In some embodiments, video advertisements may not be targeted towards any particular parameter (e.g., untargeted) and may be used in any situation.

To provide another example, after the request for the video stream 102 has been received from the user device 210, the video stream ad pod manager 222 may receive an indication that an advertiser has purchased one or more of the ad slots 112-116 via the ad provider 230. For instance, when the video stream ad pod manager 222 determines that the video stream 102 is to be provided to the user device 210, the video stream ad pod manager 222 may send a request to the ad system 224 via the ad proxy 410. In response, the ad proxy 410 may retrieve video advertisements to fill empty ad slots via the ad provider 230. Like the request described above, the request to the ad provider 230 may include an indication of a set of parameters associated with the user device 210 which allows advertisers to purchase advertising space from the streaming service 220 that is targeted towards user devices that are associated with a particular parameter (e.g., geographic location, type of device, content genre, etc.). As mentioned above, in some embodiments, video advertisements may not be targeted towards any particular parameter (e.g., untargeted). Thus, some requests may not included an indication of these types of parameters.

To provide a further example, the ad system 224 may include a database for video advertisements that were previously removed from the video stream 102, a different video stream that was provided to the user device 210, a video stream that was provided to a different user device associated with the same user or a video stream that was provided to a different user device associated with a different user. Throughout this description, this database may be referred to as an "ad bucket." Like the other sources mentioned above, when the video stream ad pod manager 222 determines that the video stream 102 is to be provided to the user device 210, the video stream ad pod manager 222 may send a request to the ad system 224 via the ad proxy 410. In response, the ad system 224 may retrieve video advertisements stored in the ad bucket. The ad bucket will be described in more detail below. Further, reference to the sources described above is merely for illustrative purposes, the exemplary embodiments are not limited to a video advertisement originating from any particular source.

In 320, the ad system 224 determines whether a particular video advertisement is scheduled for the first ad pod 110 multiple times. If there are not any duplicates of a particular video advertisement, the method 300 may continue to 340 where the portion of the video stream corresponding to the first ad pod is provided to the user device 210. If there are duplicates of a particular video advertisement, the method 300 may continue to 325.

Duplicate video advertisements may occur for any of a variety of different reasons. For example, the same video advertisement may be received from multiple sources (e.g., the database of video advertisements, the ad provider 230, the ad bucket, etc.). Alternatively, the same video advertisement may be received from the same source. For instance, an advertiser may purchase multiple ad slots corresponding to one or more user devices via the ad provider 230. This transaction may include one or more ad slots within the same ad pod (e.g., one or more of the ad slots 112-116 from the ad pod 110).

In 325, the ad system 224 removes one or more instances of the video advertisement that is scheduled for the first ad pod 110 multiple times. As mentioned above, watching the same video advertisement multiple times during the portion of the video stream corresponding to a single ad pod may cause a poor user experience. Thus, duplicate video advertisements may be removed to avoid negatively impacting the user experience.

In 330, the ad system 224 may store the one or more instances of the video advertisement in the ad bucket. As mentioned above, the ad bucket may include video advertisements that were previously removed from video streams. Thus, the one or more instances of the video advertisements removed from the ad pod 110 of the video stream 102 may be available to be included in a different video stream. The ad bucket will be described in more detail below with regard to the ad system 224 of FIG. 4.

In 335, the ad system 224 selects one or more video advertisements to fill the empty one or more ad slots of the first ad pod 110. The source of video advertisements in 335 may be the same sources described above with regard to 315. However, unlike 315, one or more video advertisements may already be scheduled for the ad pod 110. Thus, the ad system 224 may select a video advertisement for an empty ad slot based, at least in part, on the duration of the available space in the ad pod 110 and whether another instance of the video advertisement is included in the ad pod 110. This may ensure that the video advertisements included in the ad pod 110 are unique and do not appear in the same ad pod multiple times.

In 340, the streaming service 220 provides the portion of the video stream 102 corresponding to the first ad pod 110 to the user device 210. In 345, the streaming services determines whether a second ad pod is to be provided to the user device 210 during the video stream 102. If a second ad pod is to be provided to the user device 210, the method 300 returns to 315 where 315-345 may be repeated for the second ad pod. If a second ad pod is not to be provided to the user device 210, the method 300 ends.

Figure 4:
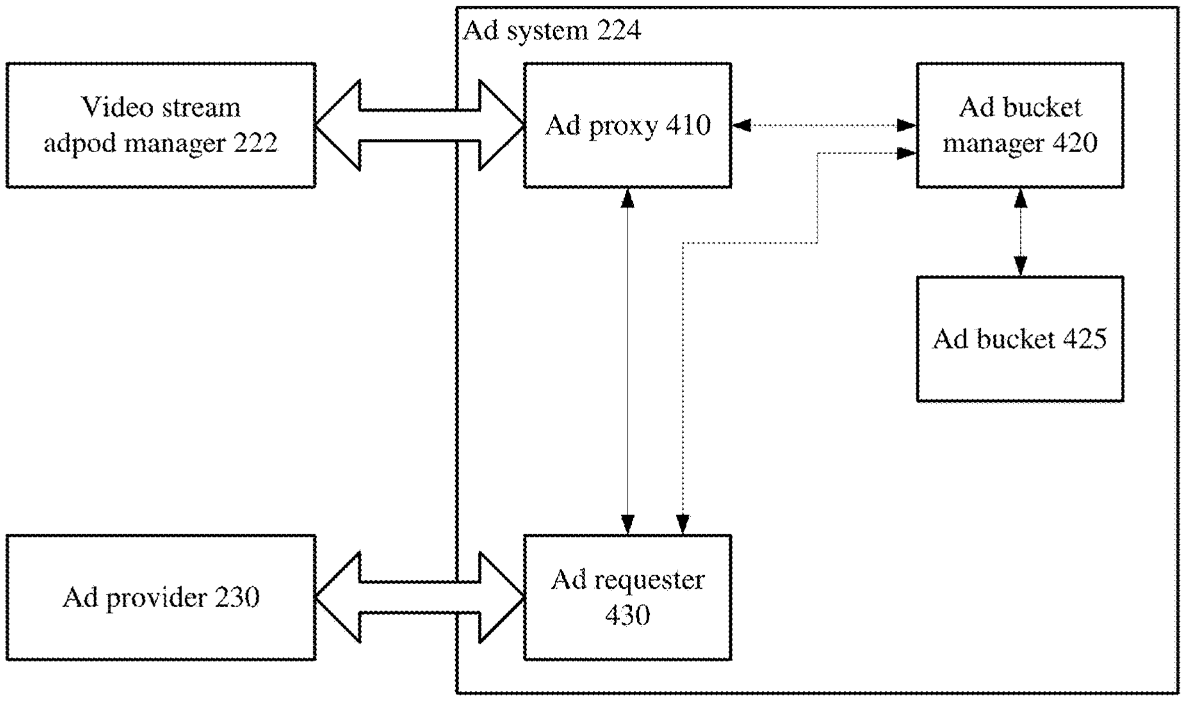
FIG. 4 shows various components of the ad system according to various exemplary embodiments.

FIG. 4 shows various components of the ad system 224 according to various exemplary embodiments. FIG. 4 will be described with regard to the arrangement 200 of FIG. 2.

The ad system 224 may include an ad proxy 410, an ad bucket manager 420, an ad bucket 425 and an ad requester 430. The exemplary embodiments are not limited to the components shown in FIG. 4, an actual ad system may be implemented using any appropriate combination of hardware, software and/or firmware.

The ad proxy 410 may represent a software component that is configured to communicate with the video stream ad pod manager 222 and determine how an ad pod is to be filled. For example, the ad proxy 410 may receive various requests corresponding to various connected user devices. Each request may be related to one or more ad pods and indicate the duration of each ad pod that is to be filled. The request may also include information identifying the corresponding user device, information identifying the program that is to be streamed to the user device, information identifying types of industry, goods and/or services that may be advertised that correspond to the program that is to be streamed, a location corresponding to the user device, viewing habits associated with the user device, etc. As mentioned above, the set of parameters may ensure that video advertisements targeting particular parameters are provided to the corresponding user device.

The ad bucket manager 420 may represent a software component that is configured to store, retrieve and remove video advertisements from the ad bucket 425. As mentioned above, the ad bucket 425 may represent a database for video advertisements that were previously removed from a video stream. In some embodiments, the advertisements may be stored in the ad bucket 425 individually. In other embodiments, two or more different advertisements may be stored in the ad bucket 425 as a set. The set of video advertisements may be stored in the same container or a video advertisement may be associated with data that indicates that the video advertisement may be part of a set of two or more video advertisements. In further embodiments, a set of advertisements may be stored as a preconfigured ad pod. In the ad bucket 425, an ad pod may be stored individually, stored with other ad pods in the same container or an ad pod may be associated with data that indicates that the ad pod may be part of a set of two or more ad pods. Throughout this description, any reference to individual video advertisements being stored in the ad bucket 425 is merely provided for illustrative purposes and is not intended to limit the exemplary embodiments in any way. The exemplary embodiments may apply to one or more advertisements being stored in the ad bucket 425 in any appropriate manner.

To store duplicate video advertisements, the ad bucket manager 420 may receive data associated with a video advertisement that includes, but is not limited to, an ID, an expiry time, one or more ad beacons, a time duration, a price, an advertiser, a type of user device, etc. The ID may be used to identify the advertisement and thus, determine whether the corresponding video advertisement is unique to an ad pod. The expiry time may indicate a time before which the corresponding video advertisement is to be provided to a connected user device. If the expiry time occurs before the corresponding video advertisement is provided to a connected user device, the streaming service 220 will not be paid for the corresponding video advertisement. Thus, the ad bucket manager 420 may remove the corresponding video advertisement based on the expiry time. Alternatively, the streaming service 220 may still provide the corresponding video advertisement to a connected user device and not be paid. The expiry time may be predetermined by the ad system 222 or may be set by the advertising source. The ad beacon may be tracked by the advertiser and indicate if the corresponding video advertisement has been viewed on a connected user device. The ad beacon may be implemented using a URL or any other appropriate mechanism. The time duration may indicate the duration of the video advertisement and may be used to ensure that if the corresponding video advertisement is to be included in an ad pod, the total duration of the video advertisements that are to be included in the ad pod do not exceed the predetermined duration of the ad pod.

To maintain the size of the ad bucket 425, the ad bucket manager 420 may perform various operations to ensure that video advertisements do not sit in the ad bucket 420 indefinitely. For example, after video advertisements have been viewed by a connected user device or returned to the ad proxy 410, the corresponding video advertisement may be removed from the ad bucket 425. In another example, a further expiry time may be assigned to a video advertisement. When the further expiry time occurs, the ad bucket manager 420 may remove the corresponding video advertisement from the ad bucket 425. Thus, a first expiry time may be set that indicates whether the streaming service 220 is to be paid for the corresponding video advertisement and second expiry time may be set that indicates when the corresponding video advertisement is to be removed from the ad bucket 420. The first expiry time and the second expiry time may correspond to the same duration or a different duration. In some embodiments, the removal process may be automatically triggered. In other embodiments, the removal process may be performed periodically based on a schedule or a timer.

During operation, a video advertisement stored in the ad bucket 425 may be scheduled to be provided to a connected user device. However, the user device may terminate the video stream before the video advertisement is viewed. To ensure that video advertisements that are scheduled but not actually viewed by a connected user device are eventually viewed, the ad bucket manager 420 may tag the video advertisement to indicate that the corresponding video advertisement is scheduled for a connected user device. If the corresponding video advertisement is not viewed, the ad bucket manager 420 may change the tag to indicate that the corresponding video advertisement is viewed. If the corresponding video advertisement is provided, the ad bucket manager 420 may change the tag to indicate that the corresponding video advertisement has been viewed. In other embodiments, the corresponding video advertisement may be removed from the ad bucket 425 and if the corresponding video advertisement is not viewed it is then re-inserted into the ad bucket 425.

The ad bucket 425 may also be used to store video advertisements that are received from a source and are to be used at a different time. For example, there may be a higher probability of returning usable video advertisements from the ad provider 230 at a particular time of day. Thus, video advertisements may be received from the ad provider 230 and stored in the ad bucket 425 for subsequent retrieval.

In some embodiments, the ad bucket 425 may store the multimedia data of the video advertisements. In other embodiments, instead of multimedia data, the ad bucket 425 may include a link or another type of relational data that may be used to access and/or call the multimedia data of the corresponding video advertisement which is stored in the different location that is within the ad system 220 or outside the ad system 220. Thus, the ad bucket 425 may store the multimedia data of the video advertisement or relational data that may be used to retrieve the multimedia data.

The ad requester 430 may represent a software component that is configured to communicate with the ad provider 230. Thus, the ad requester 430 may send requests to the ad provider 230 and receive responses from the ad provider 230. Subsequently, the ad requester 430 may send video advertisements received from the ad provider 230 directly or indirectly to the ad proxy 410 or the ad bucket manager 420.

The communication between the ad requester 430 and the ad provider 230 may be in accordance with industry standard protocols such as the Interactive Advertising Bureau (IAB) video multiple ad playlist (VMAP), OpenRTB and video ad serving template (VAST) protocols. For instance, the ad requester 430 may send an initial VMAP request to the ad provider 230 that indicates a number of available ad slots and a set of targetable parameters for the corresponding user device and/or user that is to receive a video stream. The ad provider 230 may then provide a VMAP response that contains a set of advertisement ad slots which include a combination of pre-sold video advertisements and VAST ad tags. The ad slots of the ad pod may be filled with zero or more pre-sold advertisements and the remaining ad slots of the ad pods may be filled by calling the VAST ad tags included in the VMAP response. Each VAST ad tag may return either a video advertisement, a wrapper, an empty response or an error. However, reference to IAB VMAP and VAST protocols is only for illustrative purposes. Those skilled in the art would understand that the exemplary embodiments may apply to any appropriate communication protocol.

Figure 5:
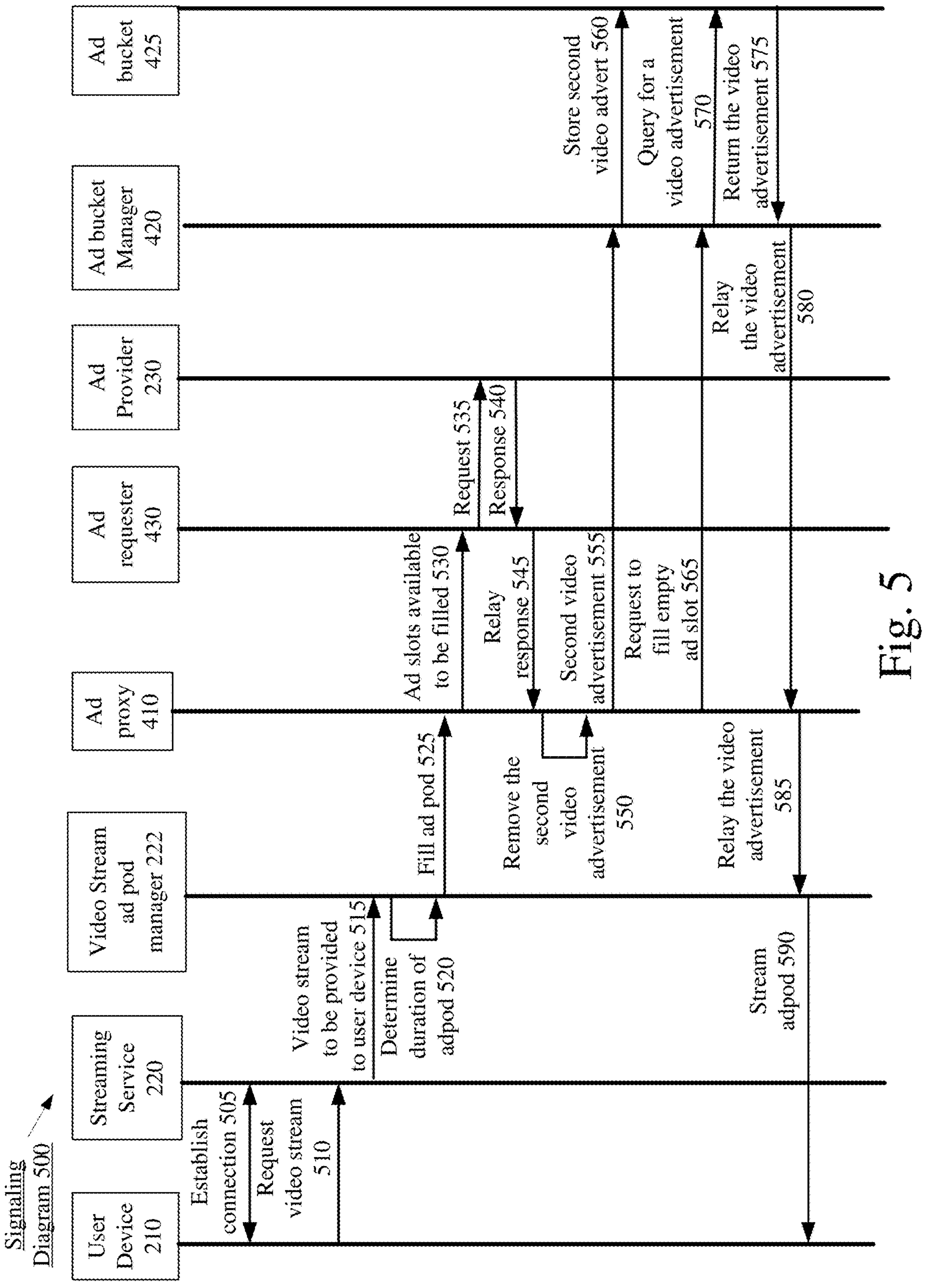
FIG. 5 shows a signaling diagram for how the various exemplary components of the ad system may be used to configure an ad pod that is to be provided to the user device.

FIG. 5 shows a signaling diagram 500 for how the various exemplary components of the ad system 224 may be used to configure an ad pod that is to be provided to the user device 210. The signaling diagram 500 will be described with regard to the video stream 102 of FIG. 1, the arrangement 200 of FIG. 2 and the ad system 224 of FIG. 4.

The signaling diagram 500 shows the user device 210, the streaming service 220, the video stream ad pod manager 222, the ad proxy 410, the ad requester 430, the ad provider 230, the ad bucket manager 420 and the ad bucket 425. The signaling diagram 500 will be described with regard to filling the ad pod 110 of the video stream 102. Further, the signaling diagram is described as utilizing the ad provider 230 and the ad bucket 425 to fill the ad pod 110. However, as mentioned above, the exemplary embodiments are not limited to these sources and an ad pod may be filled using any appropriate source.

In 505, the user device 210 and the streaming service 220 establish a connection. For example, the user may initiate a user facing application at the user device 210 that is configured to connect to the streaming service 220. In 510, the user device 210 requests the video stream 102. For example, user input at the user device 210 may indicate to the streaming service 220 that the user device 210 is requesting a linear channel stream or a program on demand.

In 515, the video stream ad pod manager 222 receives an indication that the video stream 102 is to be provided to the user device. In 520, the video stream ad pod manager 222 determines the duration (n) of the ad pod 110.

In 525, the video stream ad pod manager 222 indicates to the ad proxy 410 that the ad pod 110 with the duration (n) is to be filled. In 530, the ad proxy 410 may indicate to the ad requester 430 that ad slots 112-116 of the ad pod 110 are available to be filled. In 535, the ad requester 430 may send a request (e.g., VMAP request) to the ad provider 230. In 540, the ad provider 230 may send a response (e.g., VMAP response) indicating that a first video advertisement is to be included in the first ad slot 112, a second video advertisement is to be included in the second ad slot 114 and a third video advertisement is to be included in the third ad slot 116. The ad provider 230 In 545, the ad requester may relay the response to the ad proxy 410. In 550, the ad proxy 410 may determine whether there are any duplicate video advertisements scheduled to be included in the ad pod 110. For example, the ad proxy may compare the ID associated with each of the first video advertisement, the second video advertisement and the third video advertisement. In this example, the ad proxy 410 determines that the second video advertisement scheduled for the second ad slot 114 is a duplicate of the first video advertisement scheduled for the first ad slot 112. The ad proxy 410 may remove the second video advertisement from the second ad slot 114 and thus, the second ad slot 114 is empty.

In 555, the ad proxy 410 sends the second video advertisement to the ad bucket manager 420. In 560, the ad bucket manager 420 sends the second video advertisement to the ad bucket 425 for storage. The second video advertisement may be stored with data that includes, but is not limited to, the targetable parameters associated with the user device 210, an ID, an expiry time, one or more ad beacons, a time duration, a price, an advertiser, a type of user device, etc. As mentioned above, the second video advertisement may then be used to fill an empty ad slot in a different ad pod.

In 565, the ad proxy sends a request to the ad bucket manager 420 for a video advertisement to fill the empty second ad slot 114. To determine the duration of the empty second ad slot 114, the duration of the first video advertisement scheduled for the first ad slot 112 and the third video advertisement scheduled for the third ad slot 116 is determined. The total duration of the first video advertisement and the third video advertisement is then subtracted from the duration (n) of the ad pod 110 to determine the duration of the available space in the ad pod 110. The request to fill the empty second ad slot 114 may indicate the target parameters corresponding to the user device 210, the available space in the ad pod 110 and the IDs associated with the first video advertisement and the second video advertisement.

In 570, the ad bucket manager 420 queries the ad bucket 425 for a video advertisement. The ad bucket manager 420 may search for a video advertisement that matches the target parameters from request 565, is not configured to expire before the corresponding video advertisement is scheduled to be provided to the user device 210 as part of the video stream 102 and does not have the same ID as either the first video advertisement or the third video advertisement. As a result, a unique and unexpired video advertisement stored in the ad bucket 425 that matches one or more the target parameters from request 565 may be provided to the user device 210. This ensures that the streaming service 220 is paid for the corresponding video advertisement. As mentioned above, video advertisements may not be targeted towards any particular parameter (e.g., untargeted). Thus, reference to target parameters in the signaling diagram 500 is merely intended for illustrative purposes. The exemplary embodiments may apply to either targeted or untargeted advertisements.

In 575, the ad bucket 425 returns a video advertisement to the ad bucket manager 420. In 580, the ad bucket manager 420 relays the video advertisement to the ad proxy 410. In 585, the ad proxy 410 relays the video advertisement to the video stream ad pod manager 222. In 590, the portion of the video stream 102 corresponding to the ad pod 110 is provided to the user device 210 (directly or indirectly) via the video stream ad pod manager 222. Thus, in this example, the user device 210 is provided with three unique video advertisements during the portion of the video stream 102 corresponding to the ad pod 110.

The signaling diagram 500 describes an example in which the ad proxy 410 fills the ad pod 110 by requesting advertisements from the ad provider 230 and then requesting ads from the ad bucket 425. However, the exemplary embodiments are not limited to this sequence of events. For example, in other embodiments, the ad proxy 410 may first request advertisements from the ad bucket 425. The ad proxy 410 may then request advertisements from other sources (e.g., the ad provider 230) if any ad slots are still empty. The exemplary embodiments are not limited to utilizing the ad bucket 425 for any particular reason or at any particular time. The ad bucket 425 may be used to fill empty ad slots at any appropriate time and for any appropriate reason.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as ios, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method of generating video streams, comprising:

transmitting a first portion of a current video stream to a user device in response to a request from the user device;

selecting from a plurality of video advertisements stored in a database a first one of the video advertisements to include in a dedicated portion of the current video stream, the database including a set of video advertisements that were previously removed from a further video stream and an indication that the set of video advertisements were previously removed from the further video stream;

inserting the first video advertisement into the video stream;

transmitting a second portion of the video stream to the user device, wherein the second portion includes the first video advertisement; and after selecting the first video advertisement, removing the first video advertisement from the database.

2. The method of claim 1, further comprising:

identifying, prior to selecting the first video advertisement, that the second portion of the video stream is scheduled to include multiple instances of the first video advertisement; and removing, prior to selecting, at least one instance of the first video advertisement from the current video stream, wherein removing the at least one instance of the first video advertisement creates an empty ad slot within the second portion of the current video stream.

3. The method of claim 2, further comprising:

storing in the database the at least one instance of the first video advertisement removed from the current video stream.

4. The method of claim 3, wherein the at least one instance of the first video advertisement removed from the current video stream is selected for inclusion in an additional video stream to be provided to a further connected user device associated with a first user different than a second user associated with the user device.

5. The method of claim 1, further comprising:

determining a duration of the second portion of the video stream, wherein the first video advertisement is selected based on a duration of the second portion of the video stream and a duration of the first video advertisement.

6. The method of claim 1, wherein the database includes information relating to at least one of a duration of the first video advertisement, an expiry time for the first video advertisement, an ad beacon associated with the first video advertisement and a type of the user device relevant to the first video advertisement.

7. The method of claim 6, further comprising:

determining a set of parameters associated with the user device, wherein the first video advertisement is selected from the database based on whether at least a portion of the set of parameters matches at least a portion of information stored in the database relating to the first video advertisement.

8. A server, comprising:

a communication interface configured to provide a first video stream to a user device; and a processor configured to perform operations, comprising:

receiving a request for the first video stream from the user device;

transmitting a first portion of the first video stream to the user device in response to the request;

determining that a second portion of the video stream is to include at least one video advertisement;

selecting from a database a first video advertisement to be include in the second portion of the first video stream, wherein the database includes a set of video advertisements that were previously removed from one or more further video streams;

inserting the first video advertisement into the second portion of the first video stream; and transmitting the second portion of the video stream to the user device.

9. The server of claim 8, wherein the operations further comprising:

identifying, prior to selecting the first video advertisement, that a schedule for the second portion of the first video stream includes multiple instances of the first video advertisement; and removing from the schedule, prior to selecting the first video advertisement, at least one instance of the first video advertisement, wherein removing the at least one instance of the first video advertisement creates an empty ad slot within the second portion of the first video stream.

10. The server of claim 9, wherein the operations further comprising storing in the database the at least one instance of the first video advertisement.

11. The server of claim 10, wherein the at least one instance of the first video advertisement is selected for inclusion in a second video stream to be provided to a further connected user device and wherein the user device and a further user device are associated with different users.

12. The server of claim 8, wherein the operations further comprising determining a duration of the second portion of the video stream, wherein the first video advertisement is selected for inclusion in the second portion of the first video stream based on a duration of the second portion of the video stream and a duration of the first video advertisement.

13. The server of claim 8, wherein the database includes a set of data associated with each of the video advertisements stored therein.

14. The server of claim 13, wherein the set of data indicates an expiry time for at least one of the video advertisements stored in the database.

15. The server of claim 14, wherein the set of data indicates an ad beacon associated with the at least one video advertisement.

* * * * *